United States Patent
Chaffin et al.

Patent Number: 5,947,073
Date of Patent: Sep. 7, 1999

[54] ADHESIVELY BONDED PLASTIC AUTOMOTIVE AIR INTAKE ASSEMBLY

[75] Inventors: Kimberly Ann Chaffin, Plymouth, Minn.; James John Kempf, Canton, Mich.; Mark Christian Timney, Huron, Ohio

[73] Assignee: Ford Global Technologies, Inc., Dearborn, Mich.

[21] Appl. No.: 09/055,388

[22] Filed: Apr. 6, 1998

[51] Int. Cl.⁶ .................................................. F02B 29/00
[52] U.S. Cl. ................................... 123/184.61; 156/274.4
[58] Field of Search ........................ 123/184.61, 184.21; 156/274.4, 274.8

[56] References Cited

U.S. PATENT DOCUMENTS

| | | | |
|---|---|---|---|
| 4,301,775 | 11/1981 | Smart et al. | 123/184.61 |
| 4,941,937 | 7/1990 | Iseler et al. | 156/274.8 |
| 5,223,684 | 6/1993 | Li et al. | 156/274.4 |
| 5,477,819 | 12/1995 | Kopec | 123/184.61 |
| 5,575,249 | 11/1996 | Mielke et al. | 123/184.61 |
| 5,750,970 | 5/1998 | Chaffin | 156/274.2 |

*Primary Examiner*—Marguerite McMahon
*Attorney, Agent, or Firm*—Damian Porcari

[57] ABSTRACT

A bonded multi-piece plastic automotive air intake assembly having first and second housing members that include a 3-dimensional mating surface. The first member has a continuous first perimeter edge and the second member has a continuous second perimeter edge. The first perimeter edge has a central tongue portion that extends outwardly from the first edge. The tongue portion has first and second wall surfaces. The second peripheral edge has a groove extending inwardly from the second peripheral edge and mates with the tongue portion. The tongue portion and groove form a U-shaped channel that receives an adhesive therebetween. The adhesive forms a continuous bead that seals the channel between the first and second housing members. A plurality of alignment spacers are positioned between the tongue portion and the groove to align the tongue portion centrally within the groove.

9 Claims, 2 Drawing Sheets

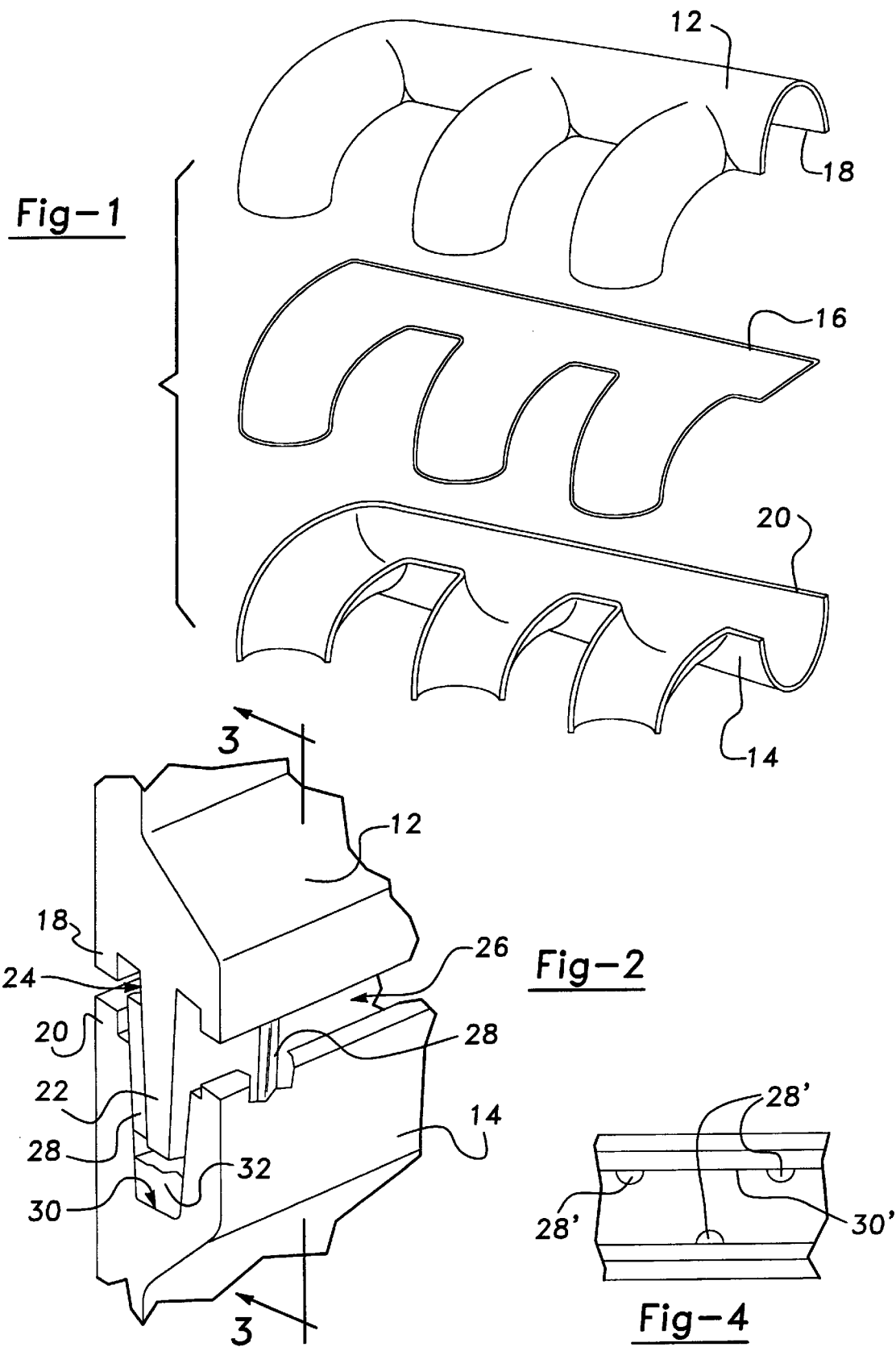

5,947,073

ADHESIVELY BONDED PLASTIC AUTOMOTIVE AIR INTAKE ASSEMBLY

BACKGROUND OF THE INVENTION

1. Field of the Invention

The present invention relates to a plastic automotive air intake assembly. More specifically, the invention relates to an apparatus for manufacturing a plastic automotive intake assembly and the construction of the attaching portions of the assembly.

2. Summary of the Related Art

It is known to make multi-piece automotive air intake assemblies from aluminum or plastic. Plastic automotive intake assemblies have been joined together by means of linear (vibration) welding. Linear welding requires a relatively flat or 2-dimensional mating surface between the upper and lower housings. The two housings are placed within a vibration welding tool and subjected to lateral displacement. The lateral displacement causes the mating surfaces between the housings to heat, soften and fuse to one another. Highly contoured or 3-dimensional pieces do not lend themselves to be vibration welded because the lateral or linear displacement of the two housing portions create gaps in the vertical portion of the housing pieces. These gaps do not heat and therefore weakens the weld between the housings.

It is known to join two plastic members together using a dielectrically heatable adhesive. An example of an application that uses dielectrically heated adhesives is explained in U.S. Pat. No. 5,223,684 (Li). The Li patent teaches joining two housing members using a dielectrically heatable adhesive. The Li patent generally teaches placing the electrodes in contact with the plastic members to be joined. When the plastic members are made from a dielectrically heatable plastic material, the plastic material tends to heat in the dielectric field. This dielectric heating of the plastic is undesirable because it interferes with the heating of the adhesive and may weaken or degrade the plastic part. It is desirable to create an electric field that primarily heats the adhesive without heating the dielectrically heatable plastic material.

It is known to create air gaps between the electrode and the plastic material in an effort to tune the electrode to provide sufficient field strength to heat the dielectrically heatable adhesive. An example of this is taught in U.S. Pat. No. 4,941,937 (Iseler) patent. The Iseler patent does not teach using the air gap to avoid heating the plastic materials and concentrating the heating effect within the adhesive. Nor does the Iseler patent teach a continuous electrode design having a relatively uniform air gap between the electrode and the plastic members.

It is desirable to provide an apparatus that concentrates the dielectric heating effect within the adhesive. It is further desirable to provide an apparatus for bonding highly contoured 3-dimensional components such as an automotive air intake assembly using dielectrically heatable adhesive and plastic members.

These and other objects, advantages and features of the present invention will become more apparent upon reference to the attached drawings and following description.

SUMMARY OF THE INVENTION

The present invention relates to a plastic automotive air intake assembly having first and second housing members that include a 3-dimensional mating surface. The first member has a continuous first perimeter edge and the second member has a continuous second perimeter edge. The first perimeter edge has a central tongue portion that extends outwardly from the first edge. The tongue portion has first and second wall surfaces. The second peripheral edge has a groove extending inwardly from the second peripheral edge and mates with the tongue portion. The tongue portion and groove form a U-shaped channel that receives an adhesive therebetween. The adhesive forms a continuous bead that seals the channel between the first and second housing members. A plurality of alignment spacers are positioned between the tongue portion and the groove to align the tongue portion centrally within the groove.

The present invention also teaches an apparatus for forming the above described air intake assembly. The apparatus includes a first continuous electrode that overlies the mating surfaces of the first and second housing members. The first electrode has a facing surface juxtaposed the first member and a shoulder surface perpendicular to the facing surface. An electrically and thermally non-conductive spacer is attached to the shoulder surface. The spacer extends a distance beyond the facing surface and contacts the first member when the apparatus is moved to a closed position. The spacer creates an air gap between the electrode and the first member. A high frequency RF generator is connected to the first electrode. The RF generator applies an electric field that is sufficient to dielectrically heat the adhesive while not damaging or degrading the plastic housing. The RF field is concentrated within the dielectrically heatable adhesive. The spacers create a relatively uniform air gap between the electrode and the housing members to reduce the dielectric heating effect within the plastic members.

BRIEF DESCRIPTION OF THE DRAWINGS

FIG. 1 is an exploded perspective view of a three piece plastic automotive air intake assembly.

FIG. 2 is a detailed view of the perimeter portion of the air intake assembly shown in FIG. 1, partially cut away.

FIG. 4 is an alternative embodiment showing spacers on the groove portion of the perimeter edge.

DETAILED DESCRIPTION OF THE PREFERRED EMBODIMENTS

Figure 3:
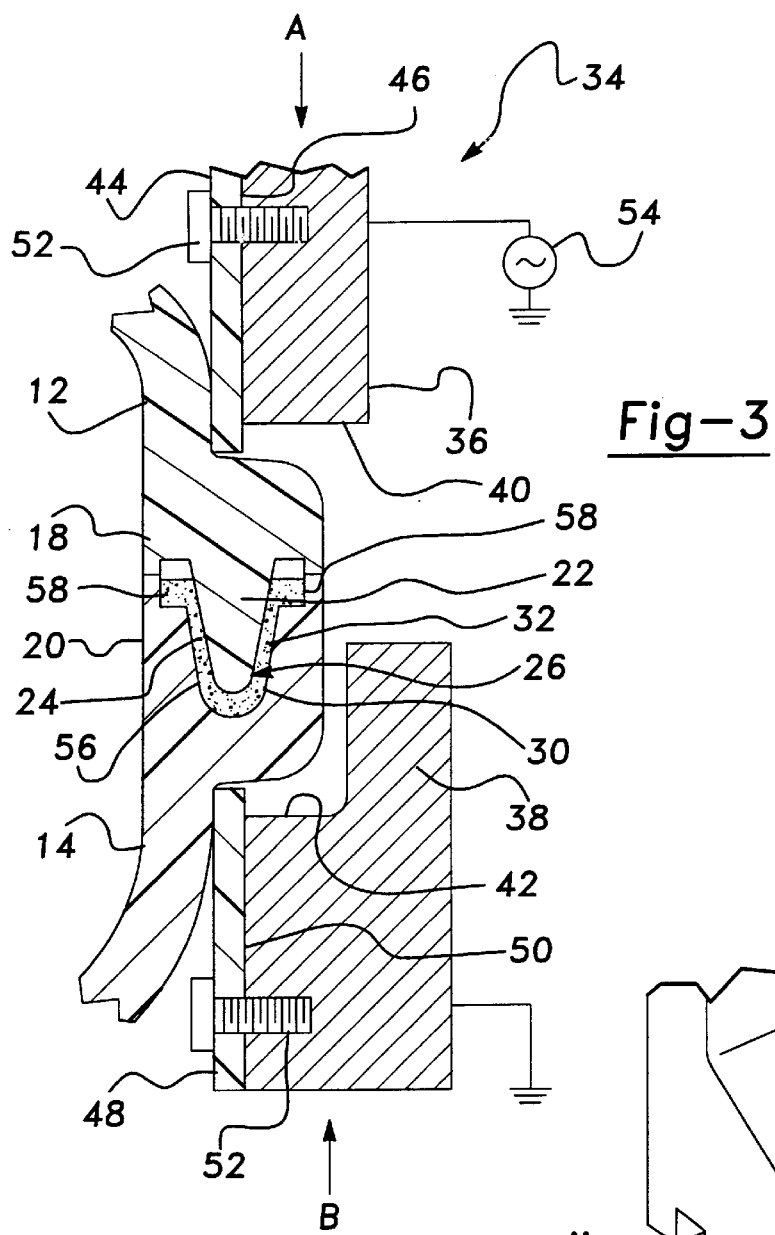
FIG. 3 is a sectional view of the portion shown in FIG. 2 taken along the line 3—3 and placed within a dielectric heating apparatus.

Illustrated in FIG. 1 is a 3-piece plastic automotive air intake assembly 10. The assembly 10 has an upper housing member 12 a lower housing member 14 and an intermediate housing member 16. The housing member 12 has a highly contoured perimeter mating surface 18 that is 3-dimensionally shaped. A mating surface 20 on the housing member 14 conforms to the shape of the mating surface 18 and together form an air tight seal when bonded. The intermediate member 16 is generally placed within the housing member 14 and is contained between the housing members 12, 14 by a compression fit.

FIG. 2 is an enlarged detailed view of the mating surfaces 18, 20 being brought together. The bonding apparatus has not been shown to improve the clarity of the illustration. The perimeter mating surface 18 has a central tongue portion 22 that generally extends outwardly from the perimeter mating surface 18. The tongue portion 22 has a first wall surface 24 and a second wall surface 26 on opposite sides of the tongue portion 22. The first and second wall surfaces 24, 26 include a plurality of alignment spacers 28. The alignments spacers 28 are positioned in an offset alternating pattern as illustrated.

The mating surface 20 includes an inwardly extending groove 30. The groove 30 receives the tongue portion 22. The spacers 28 align the tongue portion 22 centrally within the groove 30 and position the wall surfaces 24, 26 equidistant from the groove 30.

A quantity of dielectrically heatable adhesive 32 is dispensed within the groove 30 before the members 12, 14 are brought together.

The housing members 12, 14 are bonded to one another in a dielectric heating apparatus 34 as illustrated in FIG. 3. The apparatus 34 comprises electrodes 36, 38. The electrode 36 has a facing surface 40 that is juxtaposed the mating surface 18 of the member 12. The electrode 38 includes a facing surface 42 that overlies the mating surface 20 of the member 14. The facing surfaces 40, 42 are spaced a distance from the members 12, 14 by means of a spacer 44, 48. Spacer 44 is secured to the shoulder surface 46 of the electrode 36. Spacer 48 is attached to the shoulder 50 of the electrode 38. The spacers 44 and 48 are made from a non-dielectrically heatable material. Suitable materials include high density polyethylene (HDPE) or other non-conductive material. The spacers 44, 48 extend a distance beyond the facing surfaces 40, 42. When used for bonding an automotive air intake assembly made from nylon 6.6, this spacing distance is approximately between 1 and 1.5 millimeters. The exact spacing is dependent on the dielectric properties of the assembly members. The spacers 44, 48 are secured to the electrode by means of brass, aluminum or HDPE screws 52. The screws generally do not interfere with the electric field created between the electrodes. A radio frequency (RF) generator 54 is connected between the electrodes 36, 38 and creates a high frequency RF field. The high frequency RF field excites the dielectrical heatable adhesive 32 causing it to heat and cure.

A clamping mechanism (not shown) urges the electrodes 36, 38 together in the direction of arrows A. This clamping force urges the members 12, 14 toward one another and distributes the adhesive 32 in a U-shaped channel 56 formed between the tongue portion 22 and the groove 30. It is generally desirable to have a uniform space between the wall surfaces 24, 26 and the groove 30 to provide the strongest attachment between the members 12, 14. The adhesive 32 serves both to bond the members 12, 14 and to provide a continuous air tight seal therebetween. Insignificant adhesive may weaken the bond or cause air leaks between the two members. To assure that there is always significant adhesive between the members 12, 14, an excess amount of the adhesive 32 is placed within the groove 30. This excess adhesive is urged into overflow channels 58 placed adjacent the groove 30 on the mating surface 20. The overflow channels 58 receive excessive adhesive within the U-shaped channel 56. The construction of the channels 56, 58 allow for variability in dispensing the adhesive and provide for a neat bond line that is free from overflow adhesive. If the adhesive overflows the channels 56, 58, it would be exposed to the manufacturing tooling and high under-hood temperatures.

Invention illustrated in FIG. 2 shows the spacers 28 attached to the tongue 22. The invention may also be practiced by placing the spacers on the interior surface of the groove 30. This embodiment is illustrated in FIG. 4. The alignment spacers 28' are secured to the interior surface of the groove 30'.

Figure 5:
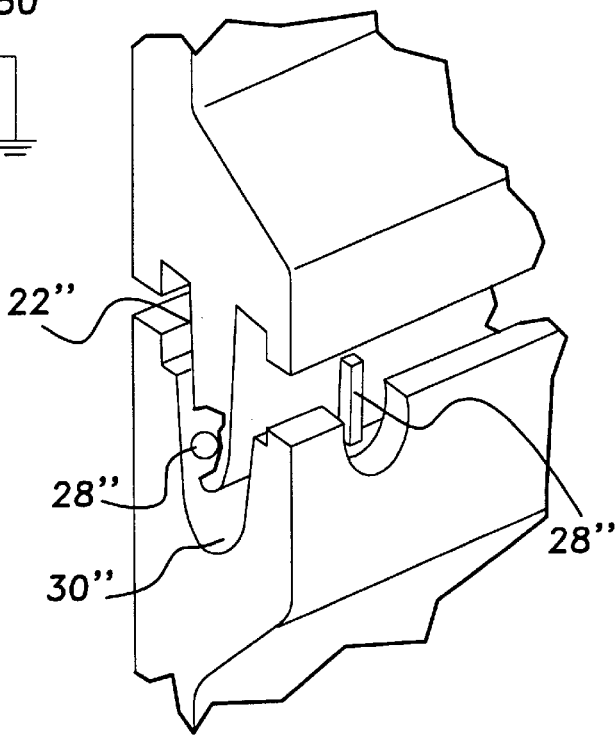
FIG. 5 is yet another alternative embodiment showing spacers attached to both the groove portion and the tongue portion of the perimeter edges.

Yet another embodiment of the present invention is illustrated in FIG. 5 where the alignment spacers 28" are attached to the tongue portion 22" and the groove 30".

The apparatus described may by used to manufacture automotive air intake assemblies made from plastic materials. Preferred plastic materials for an automotive air intake assembly include nylon. Nylon is susceptible to dielectrical heating when placed in an RF field. The amount of RF heating occurring in the assembly illustrated in FIG. 3 is dependent upon the dielectric properties of the members, the adhesive and the ambient temperature and humidity. The amount of dielectric heating occurring within the plastic members 12, 14 may be greatly reduced by providing a relatively small air gap between the electrode and the members. Relatively small air gaps are between 1 and 1.5 millimeters and result in a decrease of approximated 2.7% in the adhesive electric field strength and a decrease of over 20% in the plastic electric field strength. The small air gap avoids unwanted localized heating within the nylon material while not significantly increasing the time needed to heat the dielectrically heatable adhesive.

It was also found that the HDPE spacers provided a non-marring surface for contacting the members 12, 14. HDPE compresses slightly so as to absorb any irregularities or warps in the members 12, 14. When joining warped members without the spacer, small air gaps or pockets occur between the electrode and the plastic member. These small pockets or air gaps result in unwanted variations in the RF field. The variations consequently create hot and cold spots within the dielectrically heatable adhesive. The HDPE spacers absorb small irregularities in the members and insure a uniform RF field within the adhesive, thus avoiding localized over heating.

The present invention has been described by means of the attached drawings and forgoing specification. Alternatives to the embodies illustrated maybe apparent to those of ordinary skills in the art and are intended to be covered by the attached claims.

What is claimed:

1. A plastic automotive air intake assembly comprising:
   first and second housing members, said first ember having a continuous 3-dimensional first perimeter mating surface and said second member having a continuous 3-dimensional second perimeter mating surface;
   said first perimeter mating surface having a central tongue portion extending outwardly from said first mating surface, said tongue portion having first and second wall surfaces;
   said second peripheral mating surface having a groove extending inwardly from said second peripheral mating surface and mating with said tongue portion, said tongue portion and groove forming a U-shaped channel receiving an adhesive therebetween, whereby said adhesive forms a continuous bead that seals the channel between said first and second housing members; and
   a plurality of alignment spacers positioned between said tongue portion and said groove to align said tongue portion within said groove.

2. The air intake assembly of claim 1, wherein said alignment spacers are integrally formed on said first and second tongue wall surfaces.

3. The air intake assembly of claim 1, wherein said alignment spacers are integrally formed on said groove.

4. The air intake assembly of claim 1, wherein said alignment spacers are formed on both said tongue portion and said groove.

5. The air intake assembly of claim 1, wherein said alignment spacers are arranged in an alternating offset pattern along said first and second tongue wall surfaces.

6. The air intake assembly of claim 1, further comprising an over-flow channel adjacent said groove and extending inwardly from said second perimeter surface, said over-flow channel receiving excess adhesive from said U-shaped channel.

7. The air intake assembly of claim 1, further comprising two over-flow channels adjacent both sides of said groove and extending inwardly from said second perimeter surface, said over-flow channels receiving excess adhesive from said U-shaped channel.

8. The air intake assembly of claim 1, wherein said first and second housing members are made from a dielectrically heatable material.

9. The air intake assembly of claim 8, wherein said material is nylon.

\* \* \* \* \*